May 31, 1960 D. C. DICKSON, JR 2,938,938

PHOTO-VOLTAIC SEMICONDUCTOR APPARATUS OR THE LIKE

Filed July 3, 1956

*INVENTOR.*
DONALD C. DICKSON, Jr.

*BY* [signature]

HIS ATTORNEY 2,938,938

PHOTO-VOLTAIC SEMICONDUCTOR APPARATUS OR THE LIKE

Donald C. Dickson, Jr., Prospect Heights, Ill., assignor to Hoffman Electronics Corporation, a corporation of California Filed July 3, 1956, Ser. No. 595,630

2 Claims. (Cl. 136—89)

This invention is related to semiconductor apparatus exhibiting photo-voltaic properties, and more particularly to new and useful photo-voltaic semiconductor apparatus including a plurality of series-coupled photo-voltaic, semiconductor cells, each cell being provided with the normal P–N junction.

In the recent past, there has been developed in the semiconductor art a number of photo-voltaic semiconductor devices which are responsive to photon emanations from the sun or other light source for developing a usable electrical potential difference, which potential difference may be employed as a source of electrical potential for driving a chosen electrical load. Heretofore, photo-voltaic semiconductor devices as have been devised are in the main single-cell devices. When exposed to normal impingement of the sun's rays at noonday, for example, such devices are capable generally of producing but .4 to .6 of a volt, when no load is coupled across the semiconductor device. It would, of course, be highly desirable to develop a device consisting either of one or of a plurality of photo-voltaic semiconductor cells which would exhibit a much higher potential difference when the device is activated or energized by the sun or other light source.

Therefore, it is an object of the present invention to provide a new and useful photo-voltaic semiconductor apparatus.

It is a further object of the present invention to provide a new and useful photo-voltaic semiconductor apparatus which, through unique packaging, will be relatively compact, and will exhibit properties of high efficiency and optimum generation and preservation of electrical energy.

According to the present invention, a plurality of photo-voltaic semiconductor cells, each provided with the normal P–N junction, are bonded together in low ohmic contact in electrical series relationship. In a preferred embodiment of the present invention, the above mentioned semiconductor cells are physically disposed in stepped relationship with respect to each other so that a maximum light receiving surface area of each semiconductor cell will be exposed to photon impingement thereupon by light emanations from the sun or other light source.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

Figure 1:
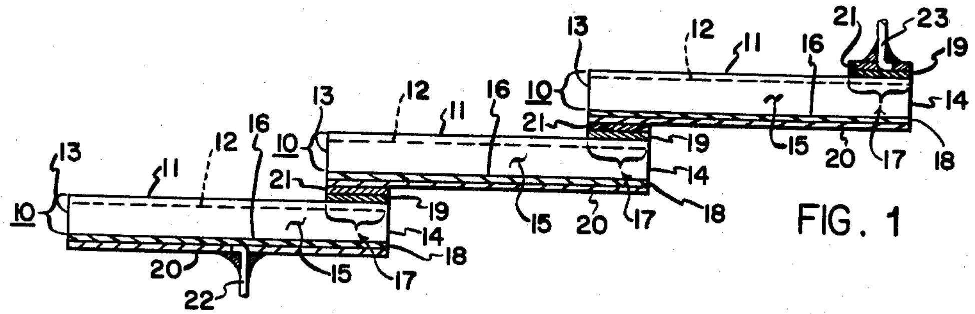
Figure 1 is a cross-sectional view of a preferred embodiment of the present invention.

In Figure 1, each of the three, photo-voltaic, semiconductor cells 10 constitutes a strip or plate of suitable semiconductor material, such as silicon or germanium, containing a selected activating substance distributed through the lattice structure of the material in order to provide desired semiconductor characteristics. Atomic quantities of the activating substance may be distributed throughout the material in proportion of the order of one atom of activating substance for every one hundred million atoms of the intrinsic material of the semiconductor cell. Aresnic, antimony, or other suitable electron donor materials may thus be employed as an activating substance to constitute the cell 10 as intrinsically an N-type semiconductor. Correspondingly, boron, aluminum, indium, or other suitable electron acceptor materials may be employed as an activating substance if it be desired to constitute the cell 10 as intrinsically a P-type semiconductor. Let it be assumed that it is desired that the intrinsic composition of cell 10 be that of N-type semiconductor material. In such event, the end, side and bottom portions of semiconductor cell 10 may be masked off and the upper surface exposed for an optimum time to the penetrations of boron gas, for example. Such gas will diffuse through the upper surface of the cell 10 and will ultimately constitute immediately beneath upper surface 11 of cell 10 a P–N junction 12.

The above description will of course apply with equal validity to each of the three-semiconductor cells shown in Figure 1.

The boron diffusion process for constituting semiconductor P–N junctions has proved very satisfactory indeed in creating P–N junctions immediately beneath the upper light receiving surface of the semiconductor cells, so as to assure the production of hole-electron pairs in the region of the junction upon light reception by the upper surface 11 of each of the cells.

After each of the cells 10 has been appropriately provided with the characteristic semiconductor P–N junction, the upper portion 11, side portions 13 and 14, and end portion 15 should be masked off with appropriate material so as to enable the electro-plating of bottom surfaces 16 with an appropriate bonding material such as copper, nickel, silver, or platinum. For purposes hereinafter explained, bonding portions or areas 17 of each semiconductor cell 10 should also be electro-plated. Thus, layers 18 and 19 of the several semiconductor cells will consist, as above stated, of copper, nickel, silver, patinum, or other suitable bonding material. After the above operation, each semiconductor cell may be dipped into a hot tin solder bath, for example, so as to provide layers 20 and 21.

Normally, tin solder will not adhere directly to silicon. Thus, upper surfaces 11, side portions 13 and 14 and end portions 15 will not have to be masked, in all probability. If, however, there is experienced some difficulty in the tinning process, then the above portions of each cell may be appropriately masked.

Either during or after the above described tinning process, the several semiconductor cells are to be placed in the physical disposition shown in Figure 1, in an enviroment of raised temperature so that the intermediate tin surfaces 20 and 21 will fuse together. After the inter-cell fusing process has been completed, wire leads 22 and 23 may be soldered or otherwise fixed to the end semiconductor cells as shown.

Figures 2, 3:
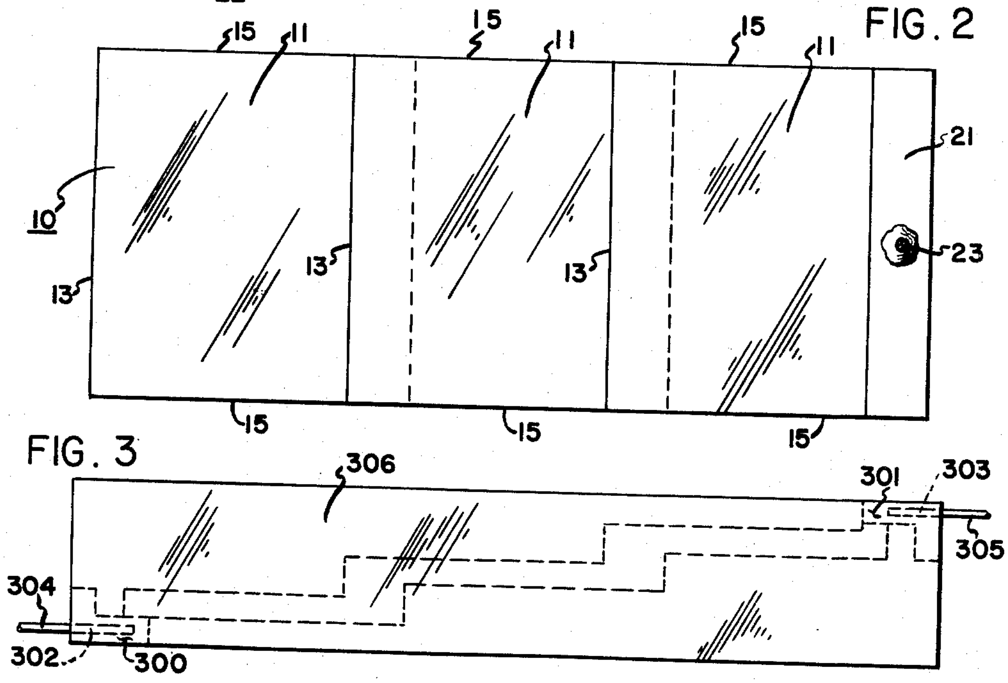
Figure 2 is a plan view of the apparatus shown in Figure 1.
Figure 3 is an additional embodiment of the present invention in which the apparatus substantially as shown in Figure 1 is encapsulated in appropriate material.

Figure 2 is merely a top or plan view of the apparatus shown in Figure 1. The apparatus shown in Figures 1 and 2 operates as follows: Upper surfaces 11 of the three semiconductor cells 10 are adapted for the reception of proton impingement of the sun's rays or other light source. Such proton impingement upon the aforementioned surfaces produces hole-electron pairs in the region of the several P–N junctions 12 so that a voltage or potential difference will exist across each semiconductor cell 10. By virtue of the several copper bonding layers and the several tin layers disposed thereupon, each of the semiconductor cells will be in low ohmic electrical contact with the adjacent semiconductor cell so that the internal resistance of the semiconductor cell combination will be minimal.

It is well recognized that resistance either of silicon or germanium is quite high, whereas the resistance of the tin solder layers and of the bonding layers will be relatively low. Thus, electric current as is produced by hole-electron pair production in those junction regions which are the most distant from the inter-cell junctures will, in the main, take an electrical circuit path of the bonding layers and tin solder layers adjacent thereto. Thus, by the inclusion of the bonding layers and tin solder layers on the entire bottom surfaces of each cell, the internal resistance of the semiconductor cell combination is reduced to a minimum. Accordingly, the semiconductor cell combination will exhibit, upon photon impingement on the several upper surfaces 11, a voltage which will thus equal the summation of the voltages developed across several P–N junctions.

Figure 4:
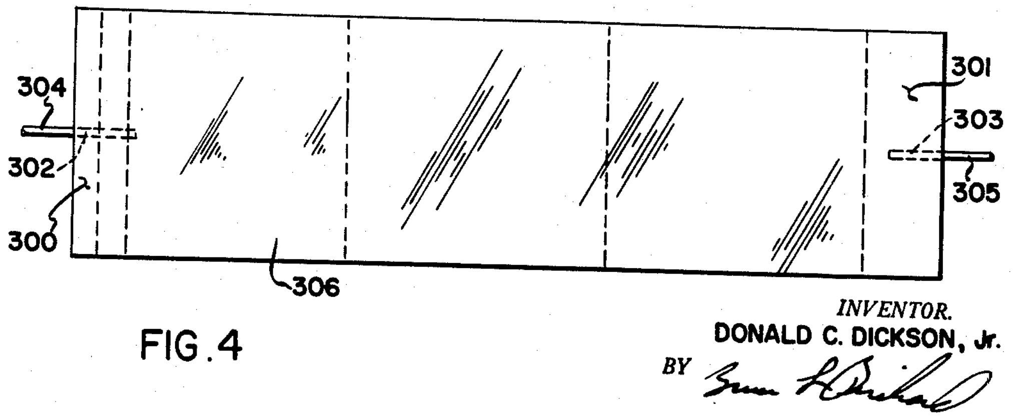
Figure 4 is a plan view of the apparatus of Figure 3.

Figures 3 and 4 are elevational and plan views, respectively, of the apparatus of Figure 1 and Figure 2, but with such apparatus being encapsulated or otherwise enclosed in a translucent plastic material, for example. The wire leads 22 and 23 of Figure 1 are replaced in the apparatus shown in Figures 3 and 4 by electrically conductive, L-shaped members 300 and 301, respectively. The members 300 and 301 may be fabricated from angularly extruded copper material and may be provided with apertures 302 and 303 to accommodate the soldering and placement therewithin of wire leads 304 and 305. The L-shaped members 300 and 301 may be caused to adhere to solder layers 20 and 21, respectively (see Figure 1) prior to the encapsulation process. Then, the semiconductor cell combination may be placed in a suitable mold for receiving the plastic material 306 of Figures 3 and 4.

The operation of the apparatus of Figures 3 and 4 is substantially identical to that of the apparatus of Figures 1 and 2; however, the embodiment shown and described in Figures 3 and 4 is believed to constitute both novel and highly appropriate packaging of the basic semiconductor cell combination. It is to be noted in both embodiments described that a maximum exposure of the upper surface of each semiconductor cell is essential. But this essential feature should be weighed as far as the point of diminishing returns is concerned, with the current carrying requirements of the load circuits to be utilizing the semiconductor device, since increasing restrictions on the cross-sectional area of each of the junctures between the semiconductor cells will have some effect upon current carrying capacity.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A unitary photo-voltaic semiconductor device comprising a plurality of series-connected photo-voltaic semiconductor cells each having an upper surface, a lower surface, and a P–N junction; said P–N junction being substantially equal in area to, and disposed solely immediately beneath, said upper surface, each of said upper surfaces of said cells having a light receiving portion and a relatively small bonding portion at a marginal edge of the surface, the entire area of said lower surfaces and said bonding portions of said cells being provided with a bonding layer and also a solder layer disposed over said bonding layer, said solder layers of said bonding portions of said cells being fused with relatively small portions of the solder layers of said lower surfaces of adjacent cells near a marginal edge thereof, and substantially all of said light receiving portions remaining exposed to external light emanations.

2. A unitary photo-voltaic semiconductor device comprising a plurality of series-connected photo-voltaic semiconductor cells each having an upper surface, a lower surface, and a P–N junction, said P–N junction being substatnially equal in area to, and disposed immediately beneath, said upper surface; each of said upper surfaces of said cells having a light receiving portion and a relatively small bonding portion at a marginal edge of the surface; low resistance means comprising a bonding layer disposed upon each of the bonding portions and the entire areas of the lower surfaces, and a solder layer disposed upon each of said bonding layers, said solder layers of said bonding portions being fused to small areas of the solder layers of the lower surfaces of adjacent cells at a marginal edge portion thereof, substantially all of said light receiving portions remaining exposed to external light emanations; a first electrical terminal in ohmic contact with the remaining one of said bonding portions; a second electrical terminal in ohmic contact with the remaining lower surface of an extreme one of said cells; and a member of at least partially translucent material encapsulating said series-connected semiconductor cells, said first and second electrical terminals remaining at least partially exposed.

References Cited in the file of this patent

UNITED STATES PATENTS

| | | |
|---|---|---|
| 2,588,254 | Lark-Horovitz et al. | Mar. 4, 1952 |
| 2,597,752 | Salisbury | May 20, 1952 |
| 2,697,269 | Fuller | Dec. 21, 1954 |
| 2,728,809 | Falkenthal | Dec. 27, 1955 |
| 2,780,765 | Chapin et al. | Feb. 5, 1957 |
| 2,794,846 | Fuller | June 4, 1957 |
| 2,823,245 | Solow | Feb. 11, 1958 |

FOREIGN PATENTS

| | | |
|---|---|---|
| 655,927 | Germany | Jan. 26, 1938 |